United States Patent [19]
Barta et al.

[11] 4,299,448
[45] Nov. 10, 1981

[54] ACOUSTO-OPTIC DEVICE

[75] Inventors: Čestmír Bárta; Jiří Čtyroky, both of Prague, Czechoslovakia; Iraida M. Silvestrova; Jurij V. Pisarevskij, both of Moscow, U.S.S.R.

[73] Assignees: Ceskoslovenska akademie ved, Prague, Czechoslovakia; Akademia Nauk, Moscow, U.S.S.R.

[21] Appl. No.: 968,930

[22] Filed: Dec. 13, 1978

[30] Foreign Application Priority Data

Dec. 20, 1977 [CS] Czechoslovakia .................. 8568/77

[51] Int. Cl.³ ............................................. G02F 1/29
[52] U.S. Cl. ................................................. 350/358
[58] Field of Search ........................................ 350/358

[56] References Cited

U.S. PATENT DOCUMENTS 3,843,234 10/1974 Dobrzhansky et al. ............ 350/358

*Primary Examiner*—William L. Sikes

[57] ABSTRACT

A single crystal of pure or mixed univalent mercury halide, is formed to have a pair of opposite faces polished for entrance and exit of the light wave at least one of the faces of this pair is perpendicular to a direction inclined about a crystallographic direction by a given angle, from the optical axis of the crystal. Another face, provided with a source of acoustic waves, makes an angle of 90° with the at least one face of the pair of faces.

5 Claims, 1 Drawing Figure

ACOUSTO-OPTIC DEVICE

BACKGROUND OF THE INVENTION

The present invention relates to an acousto-optic device particularly in apparatus suitable for deflecting light beams and for information processing, wherein the diffraction of light is obtained on application of acoustic waves in an optically anisotropic medium of a single crystal of univalent mercury halide.

Existing acousto-optic devices for deflecting light beams and for optical information processing operate on the principle of the diffraction of light wave by the application of acoustic waves induced in a suitable acousto-optic medium by a piezoelectric transducer. By changing the frequency of the acoustic wave one deflection angle of the light beam is changed. By changing the amplitude of the acoustic wave the intensity of the deflected beam is controlled. The diffraction of the light beam, on application of the acoustic wave can also result in a change of the polarization of the light wave. Depending upon the application of these devices in systems used for deflecting the light beams (e.g. deflectors) and in systems used for information processing the most important parameters of the acousto-optic device are the diffraction efficiency, i.e. the ratio between the intensities of the deflected and incident beam, and the product of the time constant $\tau$ of the device with the width $\Delta f$ of the frequency band. This bandwidth is determined on one hand by the electric and acoustic properties of the piezoelectric transducer and on the other hand by the interaction bandwidth of the acoustic and light wave. An extremely large bandwidth of the acousto-optic interaction can be attained in an optically anisotropic medium by making use of the so-called abnormal diffraction, in which the polarization of the deflected light beam changes. In an optically uniaxial media the transverse acoustic wave is introduced, as a rule, in a direction parallel or perpendicular to the optical axis, whereas the direction of the incident beam is chosen so as to have the deflected beam emerging perpendicular to the optical axis.

In using the crystal types known so far, the described arrangement leads to rather high acoustic frequencies in the gigahertz range and the diffraction efficiency is low.

In the crystal of paratellurite, strong rotation of the polarization plane of light can be utilized for the construction of an acousto-optic device with abnormal diffraction and high diffraction efficiency. The operating frequency of such acousto-optic unit is relatively low, in the range of tens of megahertz, depending on the wavelength of light employed. In this case, however, the incident light must have approximately circular polarization.

An acousto-optic delfector utilizing the abnormal diffraction in a rotated tellurium dioxide crystal is also known. The acoustic wave in the tellurium dioxide crystal propagates in the direction inclined at an angle of 6° from the [110] axis in the $(1\bar{1}0)$ plane, with the $[1\bar{1}0]$ direction of vibrations. This arrangement retains the high efficiency of interaction and removes the decrease of the diffraction efficiency in the middle of the frequency band. A disadvantage of this deflector is that the group velocity direction of the acoustic wave is inclined from the wave normal at a large angle, 51.3° nominally. Consequently, an extremely large crystal volume is required for the construction of such a deflector. Besides, deflectors made from the tellurium dioxide crystals cannot be used in the infrared spectral range beyond 5 $\mu$m. Another disadvantage is the relatively high price for the tellurium dioxide single crystals of the required dimensions and quality. In addition, still another disadvantage of the acousto-optic device made from tellurium dioxide consists in the fact that the acousto-optic quality factor $M_2$, which determines the diffraction efficiency for the diffraction by longitudinal waves, is rather small—about 1/30 of the value for the diffraction by transverse waves.

An acousto-optic device made from a single crystal of univalent mercury halide, is described by Dobrzhanskii et al. in the CSSR author's certificate No. 170 007, which has high value of the acousto-optic quality factor $M_2$ for both longitudinal and transverse waves, and which in addition transmits the radiation even in the infrared spectral range with wavelengths larger than 5 $\mu$m. A disadvantage of this device however, is that, due to the low propagation velocity of the acoustic wave, sufficient frequency bandwidth can be attained only by using a piezoelectric transducer of very small dimensions, whereby the requirements on the acoustic power density generated by the transducer are very severe.

The above-mentioned disadvantages are avoided in the acousto-optic device according to the present invention.

SUMMARY OF THE INVENTION

In accordance with the present invention a single crystal of univalent mercury halide is formed having a pair of opposed faces at least one of which is perpendicular to a direction which is rotated from the direction of the optical axis of the crystal about the crystallographic direction [KHO], (which is perpendicular to the [001] direction) by an angle $\alpha$ whose value lies between 0.1° and 15°. Another face of the crystal serving to support the source of acoustic waves makes with the at least one face of the pair of opposite faces an angle of 90°. The first pair of opposite faces is polished for the entrance and exit of the light wave.

An arrangement in which the direction [HKO] is parallel to the [110] direction may also be formed.

In another arrangement the [HKO] direction can be chosen to be parallel to the [100] direction.

The source of the acoustic wave may be chosen as a source of longitudinal wave.

In still another arrangement the source of acoustic waves can be chosen as the source of transverse waves vibrating in the [K$\bar{H}$O] direction.

An advantage of the acousto-optic device according to the invention lies in the fact that the device utilizes at the same time the high values of the acousto-optic quality factor and the high optical and elastic anisotropy of the crystals of univalent mercury halides, which results in a substantial improvement of the parameters of the acousto-optic device.

Another advantage of the acousto-optic device according to the invention is that by using a slow transverse acoustic wave one can handle the signals of longer duration than in the case of the devices made from tellurium dioxide crystals.

Still another advantage is that the acousto-optic device according to the invention requires, for comparable remaining parameters, smaller dimensions of the crystal than the acousto-optic devices hitherto known. For example, the acousto-optic device made from the tellurium dioxide crystal for the light beam width of 40 mm and the interaction length of 10 mm at mean frequency of 70 MHz requires the use of a single crystal of dimensions at least 63 mm in the direction of propagation of light, whereas the device according to the present invention, with the acousto-optic medium from mercurous chloride, requires only a single crystal of dimensions of only 12-15 mm in the direction of propagation of light in order to attain the same parameters, viz: the light beam width of 40 mm, the length of the interaction region of 10 mm, at the same mean frequency of 70 MHz.

An advantage of the acousto-optic device according to the invention, compared with the earlier acousto-optic unit made from univalent mercury halide according to the CSSR author's certificate No. 170 007, consists in the utilization of the optical anisotropy of these crystals, so that the acousto-optic device according to the invention operates in the abnormal diffraction regime. This regime makes it possible, with all other parameters of the acousto-optic device being maintained, to enlarge several times the interaction length of the acoustic and light wave and thus lower the exciting high-frequency electric power input, or to enlarge by the same factor the frequency bandwidth of the device at the same length and input power, or to enlarge both the bandwidth and length correspondingly. The acousto-optic unit made from a single crystal of mercurous bromide at the inclination angle of $\alpha = 2°25'$, interaction length of 9.5 mm and mean frequency of 40 MHz, has a frequency bandwidth of 15 MHz, as compared to the earlier acousto-optic device according to the CSSR author's certificate No. 170 007 by which it is necessary to reduce the length approximately ten times in order to attain the same bandwidth. The required high-frequency input power for the acousto-optic device according to the invention is thereby reduced to 1/5 and the requirement on the power density of the acoustic wave generated by a piezoelectric transducer, as well as the concommitant electric and thermal load of the transducer, is lowered to 1/50 of the value required in the arrangement after the CSSR author's certificate No. 170 007.

BRIEF DESCRIPTION OF THE DRAWINGS

In the drawing, the single FIGURE illustrates an acousto-optic device formed of an optically anisotropic medium of a single crystal of univalent mercury halide.

DESCRIPTION OF THE INVENTION

Figure 1:
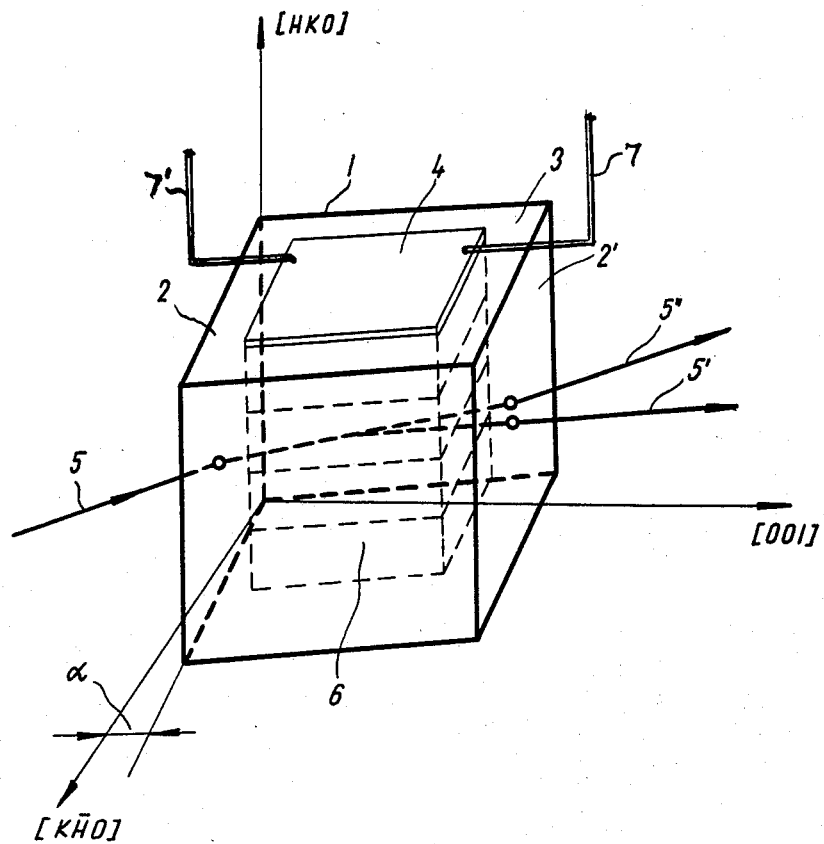

The following four Examples set forth several illustrative embodiments of the present invention, each of which can be clearly followed with the single drawing in which the crystal formation is schematically shown. In each of the examples an acousto-optic device formed of a single anisotropic crystal structure of univalent mercury halide (roughly illustrated in cubic form) having an acoustic wave source 4. The source 4 is a piezoelectric transducer formed preferably of a single crystal of a lithium compound such as lithium niobate $LiNbO_3$, lithium iodate $LiIO_3$, lithium tantalate $LiTaO_3$, and silicon dioxide $SiO_2$.

The crystal is ground and formed into a plate, the thickness of which and the crystallographic orientation of which is chosen and thus formed, to provide the frequency and kind of wave desired for each of the respective optic crystals of the examples. The ground plate is equipped with electrodes 7 and 7'.

EXAMPLE 1

The acousto-optic device according to the invention consists of a mercurous halide single crystal 1, at least one of whose opposite faces 2, 2' is perpendicular to a direction, inclined from the direction of the optical axis [001] of the crystal, about the crystallographic direction [HKO] (which is equal to [110]) at the angle $\alpha$. Another face 3 of the crystal is perpendicular to the crystallographic direction [110] and therefore perpendicular to at least one face of the pair 2,2'. The face 3 is provided with the source 4 of longitudinal acoustic waves. The opposite faces 2, 2' are polished for the entrance 5 and the normal exit 5' of the light wave. Polishing the other faces of the acousto-optic device is not required for its operation; however, it can be advantageous in some cases.

The longitudinal acoustic wave 6 propagates along the [110] crystallographic direction. The incident light wave 5 propagates in the acousto-optic device in the plane inclined about the propagation direction of the acoustic wave by angle $\alpha$ and has extraordinary polarization, i.e. the vector of its electric field strength lies in the plane defined by the propagation direction of the light wave and by the direction of the optical axis of the crystal. The diffraction of the light wave in the acousto-optic device occurs in the plane defined by the direction of propagation of the acoustic wave 6 and by the propagation direction of the light wave 5. The resulting diffracted light wave 5' emerges from the acousto-optic device polarized like an ordinary light wave, i.e. the vector of its electric field strength is pendicular to the plane defined by the propagation direction of the light wave and by the direction of the optical axis [001] of the crystal. Without the acousto-optic interaction the light wave emerges in the direction 5". The propagation velocity of the acoustic wave in this case is 2054 $m.sec^{-1}$.

EXAMPLE 2

An acousto-optic device is formed analogously to the arrangement of Example 1 but consists of a mercurous bromide crystal, with the crystallographic direction [HKO] parallel to [100]. In this case the propagation velocity of the acoustic wave is only 1487 $m.s^{-1}$.

EXAMPLE 3

An acousto-optic device is formed analogously to the arrangement of Example 1 but consists of a mercurous iodide crystal provided with a source 4 of transverse acoustic wave vibrating in the [110] direction. In this device the propagation velocity of the acoustic wave is merely 253 $m.sec^{-1}$.

EXAMPLE 4

An acousto-optic device is formed analogously to the arrangement of Example 2, but with the source 4 of transverse acoustic wave vibrating in the [010] direction. Here the acoustic wave propagates at a velocity of 1249 $m.sec^{-1}$. If mercurous bromide of this example is replaced by mercurous chloride, the propagation velocity of the acoustic wave increases up to 1305 $m.sec^{-1}$. If it is replaced by mercurous iodide, the propagation velocity of the acoustic wave decreases to 1204 $m.sec^{-1}$.

The acousto-optic device according to the invention can be used with the advantages previously enumerated for deflecting light beams in data recording systems, in large-surface laser displays, in holographic memories, in systems for optical information processing—signal compression, matched filtration, correlation—and elsewhere.

What we claim:

1. An acousto-optic device comprising a single crystal of pure or mixed univalent mercury halide, having a first face provided with a source of acoustic waves, a pair of opposed faces polished for the entrance and exit of light waves, one of said polished faces being perpendicular to a direction which is inclined from the direction of the optical axis of the crystal and is rotated about the crystallographic direction, by a predetermined angle from the crystallographic direction, [KH̄O] said angle being between 0.10° and 15.0° and said first face making an angle of 90° with said one polished face.

2. The acousto-optic device according to claims 1, wherein the direction is parallel to the [110] direction.

3. The acousto-optic device according to claims 1, wherein the direction [HKO] is parallel to the [100] direction.

4. The acousto-optic device according to claims 1, wherein the source of the acoustic wave is a source of longitudinal acoustic wave.

5. The acousto-optic device according to claim 1, wherein the source of the acoustic wave is a source of transverse acoustic wave vibrating in the direction.

* * * * *